(No Model.)

L. THURSTON & G. STANTON.
ICE CUTTING MACHINE.

No. 421,209. Patented Feb. 11, 1890.

Witnesses.
A. Ruppert
H. A. Daniels

Inventors.
Louis Thurston,
Garrett Stanton,
Per Thomas P. Simpson
atty

UNITED STATES PATENT OFFICE.

LOUIS THURSTON AND GARRETT STANTON, OF HARDIN, MISSOURI.

ICE-CUTTING MACHINE.

SPECIFICATION forming part of Letters Patent No. 421,209, dated February 11, 1890.

Application filed August 31, 1889. Serial No. 322,624. (No model.)

*To all whom it may concern:*

Be it known that we, LOUIS THURSTON and GARRETT STANTON, citizens of the United States, residing at Hardin, in the county of Ray and State of Missouri, have invented certain new and useful Improvements in Ice-Cutting Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of our invention is to make an ice-cutting machine which can be worked by two men, so as to cut square or rectangular blocks of ice evenly and with great rapidity.

The invention will first be described in connection with the drawings, and then pointed out in the claim.

Figure 1:
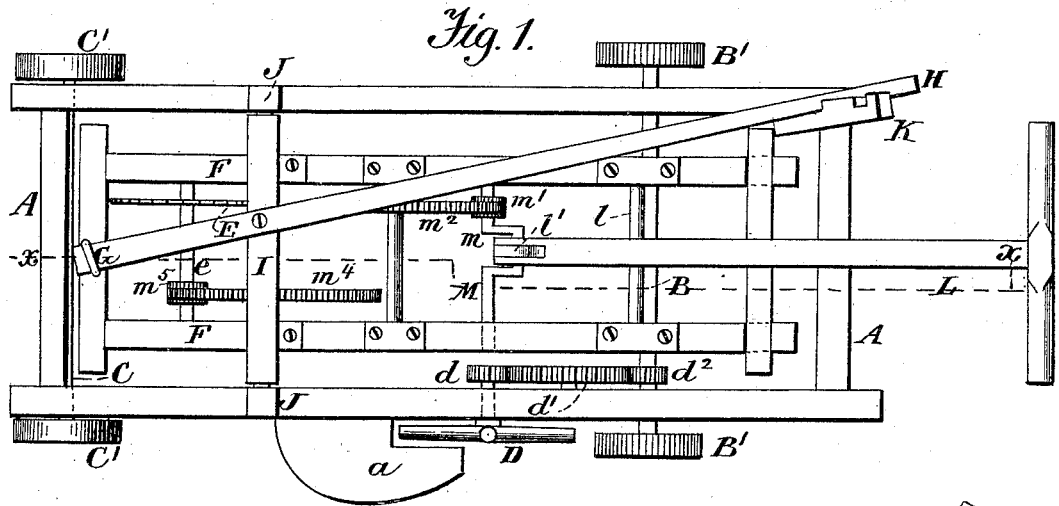
Figure 2:
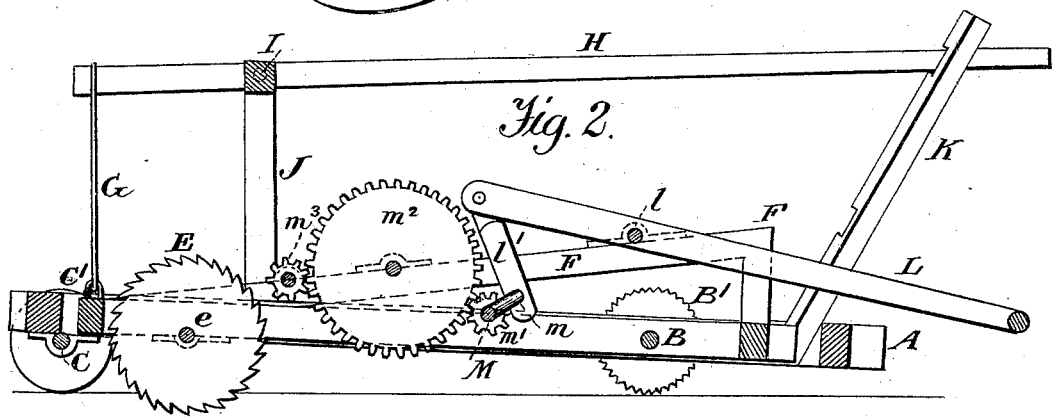
Figure 3:
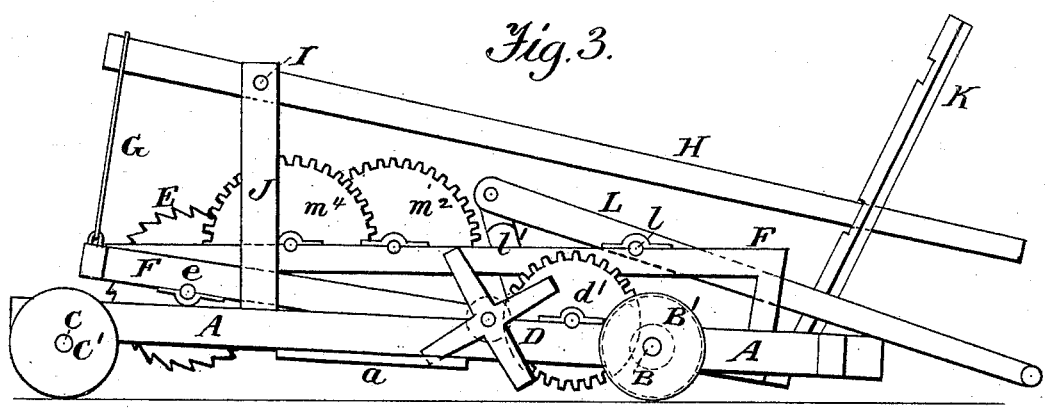

Figure 1 of the drawings is a plan view; Fig. 2, a longitudinal vertical section on the dotted line $x\,x$ of Fig. 1, and Fig. 3 an elevation.

In the drawings, A represents a rectangular frame, in which are journaled the axles B C, to which are made fast the wheels B' C'. On one side of the frame A is placed a platform $a$, on which a man stands in order that he may turn the hand-wheel D, which drives the gear-wheels $d\,d'\,d^2$ on their respective shafts, so as to turn the axle B, and thus feed the saw up to the ice.

The saw E is carried on a shaft $e$, journaled in the frame F, which is pivoted to the shaft B and raised in front more or less by means of the rod G and lever H, the latter being made fast on a shaft I, journaled in the vertical standards J J, the latter being supported on the frame A and held higher or lower by the rack K.

L is a T-lever fulcrumed on a rod $l$ in the frame F and connected by a pivoted rod $l'$ with the crank $m$ of the drive-shaft M, the latter being connected with the saw-shaft $e$ by the intervening gear-wheels $m'\,m^2\,m^3\,m^4\,m^5$, so as to rotate the saw.

The frame A being on wheels and the mechanism not very weighty, the whole is very easily managed and operated by two men.

In actual practice the machine is found to do excellent work, to require little power, and to cut a great deal of ice in a given time.

The operation is as follows: The machine is moved upon the ice to the position desired by horse or other power. Then by working the T-lever L up and down the saw is rotated and made to cut the ice by one man, while another man, who stands on the foot-support $a$, turns the hand-wheel D, so as to feed the saw up to the ice.

What we claim as new, and desire to protect by Letters Patent, is—

The T-lever L, fulcrumed at $l$ on the saw-frame and connected by a pivoted rod $l'$ to the crank of the drive-shaft M, in combination with the frame A, the saw-shaft $e$, and the mechanism $m'\,m^2\,m^3\,m^4\,m^5$, which connect the shafts M $e$, as and for the purpose set forth.

In testimony whereof we affix my signatures in presence of two witnesses.

LOUIS THURSTON.
GARRETT STANTON.

Witnesses:
JOHN W. GROVE,
RUBEN STANTON.